(12) United States Patent
Sabin et al.

(10) Patent No.: US 8,943,320 B2
(45) Date of Patent: Jan. 27, 2015

(54) TECHNIQUES FOR AUTHENTICATION VIA A MOBILE DEVICE

(75) Inventors: Jason Allen Sabin, Lehi, UT (US); Jeremy Ray Brown, Orem, UT (US); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 333 days.

(21) Appl. No.: 13/285,487

(22) Filed: Oct. 31, 2011

(65) Prior Publication Data
US 2013/0111208 A1 May 2, 2013

(51) Int. Cl.
| | |
|---|---|
| *H04L 29/06* | (2006.01) |
| *G06F 21/35* | (2013.01) |
| *G06F 21/36* | (2013.01) |
| *H04W 4/00* | (2009.01) |
| *H04W 12/06* | (2009.01) |
| *H04L 9/32* | (2006.01) |

(52) U.S. Cl.
CPC ............... *G06F 21/35* (2013.01); *G06F 21/36* (2013.01); *H04W 4/00* (2013.01); *H04W 12/06* (2013.01); *H04L 9/3226* (2013.01); *H04L 9/3247* (2013.01); *H04L 2209/76* (2013.01); *H04L 2209/80* (2013.01); *G06F 2221/2115* (2013.01); *G06F 2221/2153* (2013.01); *G06F 2221/2107* (2013.01); *G06F 2221/2119* (2013.01)
USPC .............................................. 713/171; 726/5

(58) Field of Classification Search
CPC .......... G06F 21/35; G06F 21/36; G06F 21/43
USPC .................. 713/171, 16, 176; 726/1, 3, 5
See application file for complete search history.

(56) References Cited

U.S. PATENT DOCUMENTS

| | | | |
|---|---|---|---|
| 6,567,530 B1* | 5/2003 | Keronen et al. ................ | 382/100 |
| 8,196,131 B1* | 6/2012 | von Behren et al. .......... | 717/168 |
| 2006/0174121 A1* | 8/2006 | Omae et al. .................... | 713/172 |
| 2007/0215685 A1* | 9/2007 | Self et al. ....................... | 235/375 |
| 2009/0238625 A1 | 9/2009 | Ming | |
| 2009/0238626 A1 | 9/2009 | Ming | |
| 2010/0155479 A1* | 6/2010 | Ming .......................... | 235/462.1 |
| 2010/0157318 A1 | 6/2010 | Ming | |
| 2011/0219427 A1* | 9/2011 | Hito et al. .......................... | 726/3 |
| 2012/0042363 A1* | 2/2012 | Moosavi et al. .................... | 726/5 |
| 2012/0330707 A1* | 12/2012 | Loucks .......................... | 705/7.13 |
| 2013/0031623 A1* | 1/2013 | Sanders .......................... | 726/19 |

OTHER PUBLICATIONS

Dodson, Ben, et al., "Secure, Consumer-Friendly Web Authentication and Payments with a Phone", 1-21, Oct. 2010.

* cited by examiner

*Primary Examiner* — Chau Le
(74) *Attorney, Agent, or Firm* — Schwegman Lundberg & Woessner, P.A.

(57) ABSTRACT

Techniques for authentication via a mobile device are provided. A mobile device is pre-registered for website authentication services. A user encounters a website displaying an embedded code as an image alongside a normal login process for that website. The image is identified by the mobile device, encrypted and signed by the mobile device and sent to a proxy. The proxy authenticates the code and associates it with the website. Credentials for the user are provided to the website to automatically authenticate the user for access to the website bypassing the normal login process associated with the website.

12 Claims, 4 Drawing Sheets

TECHNIQUES FOR AUTHENTICATION VIA A MOBILE DEVICE

BACKGROUND

Increasingly, consumers are embracing a variety usage of Quick Response (QR) codes to perform a variety of transactions. QR codes are a form of a barcode or an encrypted string of unique characters. Consumers use their smart phones, equipped with cameras, to have their mobile phones scan these codes and decrypt the contents to locate and visit a website.

For example, often a newspaper article will include a QR code that a consumer can scan with his/her smart phone. When the smart phone scans the QR code, the consumer's phone automatically brings up a browser and traverses to a specific website identified by the QR code. This provides the consumer with additional information related to the newspaper article and saves the consumer a variety of keying strokes on the smart phone to automatically visit the desired website.

In some cases, the QR code can also be used to download an application to the consumer's smart phone. So, the consumer scans a QR code from a display or from printed material (as discussed above with the newspaper example) and a mobile application is downloaded to the consumer's mobile phone.

Most, applications related to QR codes have been limited to providing consumers with additional information about goods and services, permitting consumers to enroll in programs, and downloading mobile apps to a consumer's mobile device.

However, very little has been achieved with respect to QR codes and user authentication.

SUMMARY

Various embodiments of the invention provide techniques for authentication via a mobile device. Specifically, a method for authentication, via a mobile device is presented.

A mobile device of a user is pre-registered for automated resource authentication. Subsequently, an encrypted and signed code that is sent from the mobile device is acquired. Next, the encrypted and signed code is authenticated and a decrypted version of the encrypted and signed code is associated with a specific resource. Finally, the user is automatically authenticated to the specific resource for access.

DETAILED DESCRIPTION

Figure 1:
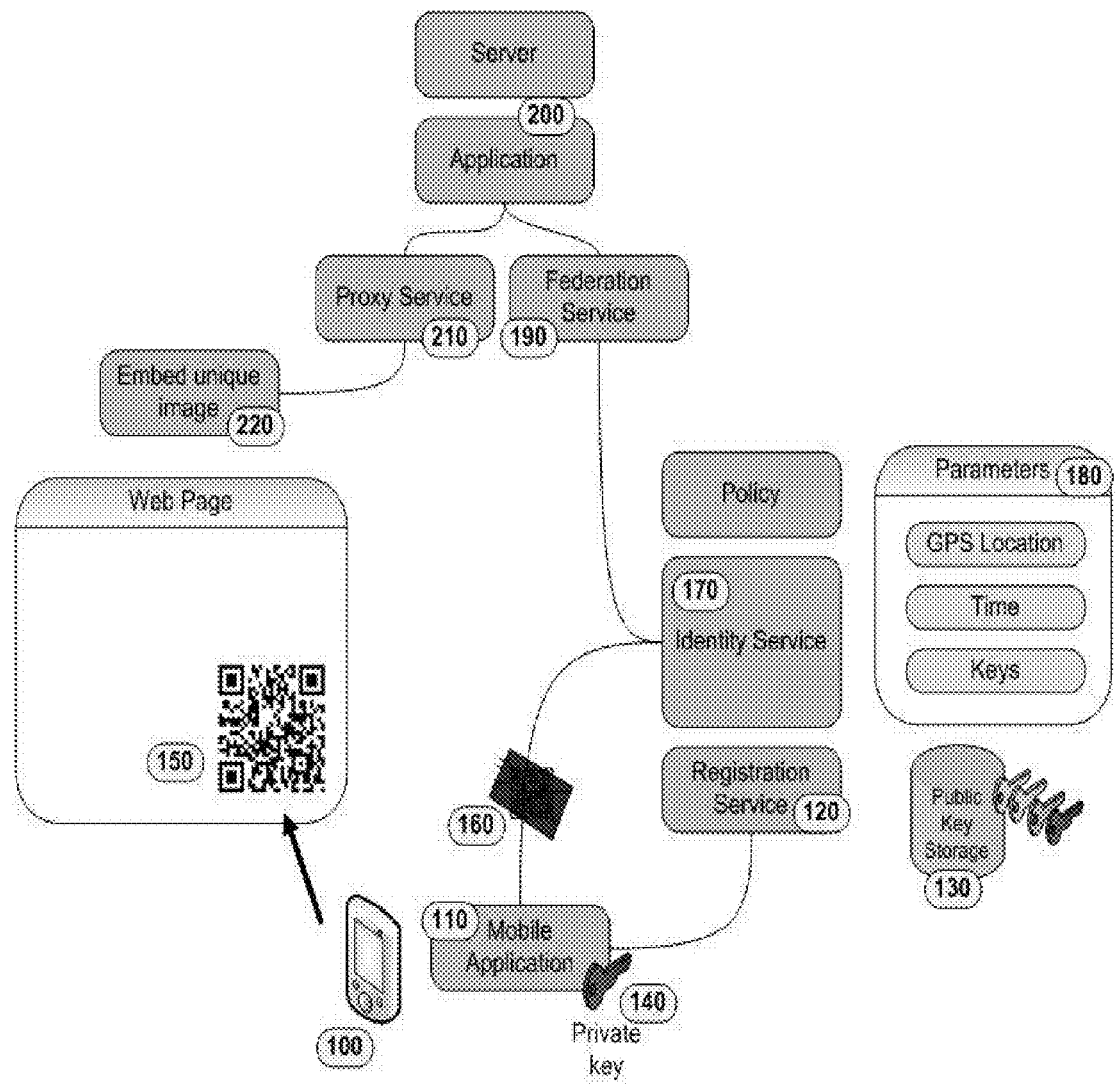
FIG. 1 is a diagram of an example architecture for authentication via a mobile device, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "mobile device" as used herein refers to processing devices that are portable and that include a camera for scanning or capturing images. Some example mobile devices include portable phones, tablets, laptops with built in cameras, personal digital assistants, and the like.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

As used herein, the terms/phrases "Quick Response (QR) code," "barcode," and "encoded string of characters" may be used synonymously and interchangeably.

Various embodiments of this invention can be implemented in existing network architectures. For example, in some embodiments, the techniques presented herein are implemented in whole or in part in the Novell® operating system products, directory-based products, cloud-computing-based products, proxy products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

FIG. 1 is a diagram of an example architecture for authentication via a mobile device, according to the techniques presented herein. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured to execute the components.

The FIG. 1 is presented with reference to a variety of specific example situations that a user with a mobile device may encounter or that a website provider may encounter. These are presented for purposes of illustration only as other situations can occur as well and still benefit from the techniques presented herein and below.

It seems that most current smart phones have the capability to take pictures, via an embedded camera device. Moreover, it would seem that most current smart phones have the ability to read in bar codes, QR codes, and other types of codes/numbers, via embedded software to decrypt these codes. Essentially, QR codes may be viewed as numbers, just like a bar code is just a number from the perspective of computer processing.

The techniques herein provide mechanisms for securely performing mobile device authentication by taking a picture of one of these QR codes and combining the resulting code/number with novel processing. It is not necessarily the mobile device that is authenticated with the techniques presented herein and below; but, rather a user that is authenticated to a website or website service, via the mobile device (as discussed herein and below).

How such authentication is achieved is discussed herein and below with reference to the FIG. 1 (and subsequently herein with respect to the FIGS. 2-4).

Processing, in the FIG. 1, starts at 100 with a mobile device, such as a smart phone, a personal digital assistant (PDA), a tablet, a laptop, etc. (any portable device with an embedded camera and barcode (QR code) processing). Thus, the phrase "mobile device" is intended to refer to a portable processing device with a camera and an application that can scan barcodes, QR codes, etc.

The mobile device has a mobile application installed, at 110. This mobile application is installed to scan QR codes and to perform encryption/decryption functions on the codes. The mobile application (may also be referred to herein as "mobile app") registers its mobile device with a registration server (120). With the registration service, a user is registering his/her mobile device and identifying it to the registration service for subsequent automated processing (as described herein and below).

When the mobile device is being registered, the registration service generates a key pair for the mobile device. The public key is kept in the Public Key Storage (130) of the server or a third-party service in trusted communication with the server, while the private key is sent to the Mobile Application 110 to be stored on the mobile device and securely managed from the mobile device. (The private key is shown at 140.) All processing is performed over a Secure Socket Layer (SSL) connection to maintain the security of any key transfers. Optionally, the Mobile Application 110 can generate a key pair and move the public key up to the Registration Service. At this point, an Identity Service has the ability to uniquely identify the mobile device from all other mobile devices in the system.

Now that the mobile device has been registered, identified, and now holds a private key, authentication using via the mobile device can be achieved in the manners discussed herein and below.

More and more web users are noticing that QR codes are appearing with more frequency on websites. Typically, the noticed QR codes are previously statically-generated codes that when once scanned in server as an identifier for a particular application to install on the mobile device. (Also, these static QR codes are often used to initiate a browser on the mobile device and traverse to a specific website identified by the codes.) The practice or automatic application installation and website traversal are common with Android phones and even iPhones®. So, scanning the QR code instructs mobile apps to install an application identifier (id) on the mobile device that scanned it.

With embodiments presented herein, suppose (referencing FIG. 1) that a user browses to a website, which displays a login page, at 150, but in the corner it also displays a QR code. The user may or may not have reached the website, via the mobile device. That is, the user may be using an entirely different device, such as a computer, tablet, or laptop to encounter the website. Moreover, the user desires to authenticate to a service associated with the website, which is why the website is providing a login page for the user to authenticate to for access to the desired resource/service of the website. With techniques presented herein, the user now has the option to perform the mobile device authentication using the approaches taught herein and below.

The website QR code (can be any encrypted string that can be processed by a barcode scanner application of a mobile device), which is displayed on the screen is actually a random unique number (once decrypted) that was generated for the website.

In cases, where the user is accessing the website via a different device from that which is associated with the mobile device of the user, the user uses his/her mobile device to launch a mobile application 110 and take a picture of the QR code using an embedded camera device of the mobile device. The mobile app helps get the correct image snapshot, just like an Android application or an iPhone® RedLaser® application. Again, the QR code is really a unique session-generated number. The mobile application gets the number from the QR code picture.

Next, the mobile application takes its private key 140 (mobile device's private key or specific instance the mobile app's private key installed on a specific mobile device) and then encrypts and signs the unique number (acquired via decrypting the scanned QR code). The mobile application sends the encrypted and signed unique number (160) to the Identity Service 170, which was assigned to the mobile device during the registration process (discussed above).

It is noted that in cases where the user has traversed to the website via the mobile device, the scanning of the QR code presented on the website need not occur. In such a case, the mobile app or another embedded app of the mobile device can recognize the embedded image of the website and process it to see if it is a QR code and then perform the processing discussed above to decrypt the QR code to obtain the number and to encrypt and sign the QR code with the private key (of the mobile device or the specific instance of the mobile application of the specific mobile device).

The Identity Service uses the public key (of the mobile device of the specific instance of the mobile app on this specific mobile device) to verify the identity of the mobile device. The identity service verifies the signature and decrypts the message to get the unique random number, which was sent to it (displayed and generated for the website). The message also includes which server, web-page the user is accessing. Policy can now be checked to verify authorization and verify that this particular user can access the website having the QR code.

Additional parameters can also be used and validated against, as shown at 180. The mobile application may also send the Global Positioning Satellite (GPS) location and a specific time to perform authorization against. Additionally, keys may be valid for only a certain predefined amount of time. The Identity Service may also determine when a new key needs to be issued. The Identity Service may either generate the new key pair or have the mobile application generate the key pair and send the Identity Service the new public key (the mobile device locally retaining the private key). The process of new key generation is similar to the registration process; just with new keys.

The Identity Service can now send a token with the unique number and session information to a federation service, at 190. The entities are separated in the FIG. 1 to demonstrate that two entities or one entity can be used.

The federation service then hands the information to a local proxy service, at 210. The proxy service is a frontend for the actual application and server 200 associated with the website that the user is visiting and trying to authenticate to. The application and server 200 do not know anything about the QR codes or the mobile device. So, the application and server 200 can be pre-existing legacy websites that are not equipped to achieve authentication in the manners presented herein. These legacy sites can still be integrated into the processing described, via the actions of the proxy service.

When the mobile device made the initial request, it actually made the request to the proxy service that was fronting the web application 200. The session was created with the proxy service. The proxy service generates the random number and creates the QR code image and the entire login page. So, in some cases, the proxy service can be viewed as a transparent and reverse proxy of the website.

Optionally the proxy service can use the login page provided by the web application 200, and then embedded the QR code into the actual Hyper Text markup Language (HTML) page for the website. This is demonstrated at 220. Again, the proxy service can be a transparent and reverse proxy of the website in this scenario as well.

Essentially, the login page can be bypassed via the mobile device authentication and the service associated with the resource requiring the login can be entirely unaware of the processing, since the proxy acts as a frontend for that resource.

To log the user into the website, the proxy, after determining that the signed QR code is associated with a registered mobile device of the user, acquires credentials for the user from an identity service and automatically logs the user into the website for access to the desired website services. These credentials may be registered by the user during the mobile device registration process. It may also be that the website permits authentication via an assertion that the identity service can make on behalf of the user once the proxy is satisfied the user is authenticated, via the process discussed above.

The techniques herein provide: 1) the ability to use a proxy service to perform the QR code image embedding for a website where the server and application do not have to know anything about QR codes or even what it is doing; 2) usage of a $3^{rd}$ party Identity Service with a Policy engine configured to perform the Identity and Authorization of the mobile device using the encrypted QR code; 3) usage of GPS location, random time, and random keys to perform policy authorization; and/or 4) dynamically embedded a QR code image instead of a page for use of authentication.

Figure 2:
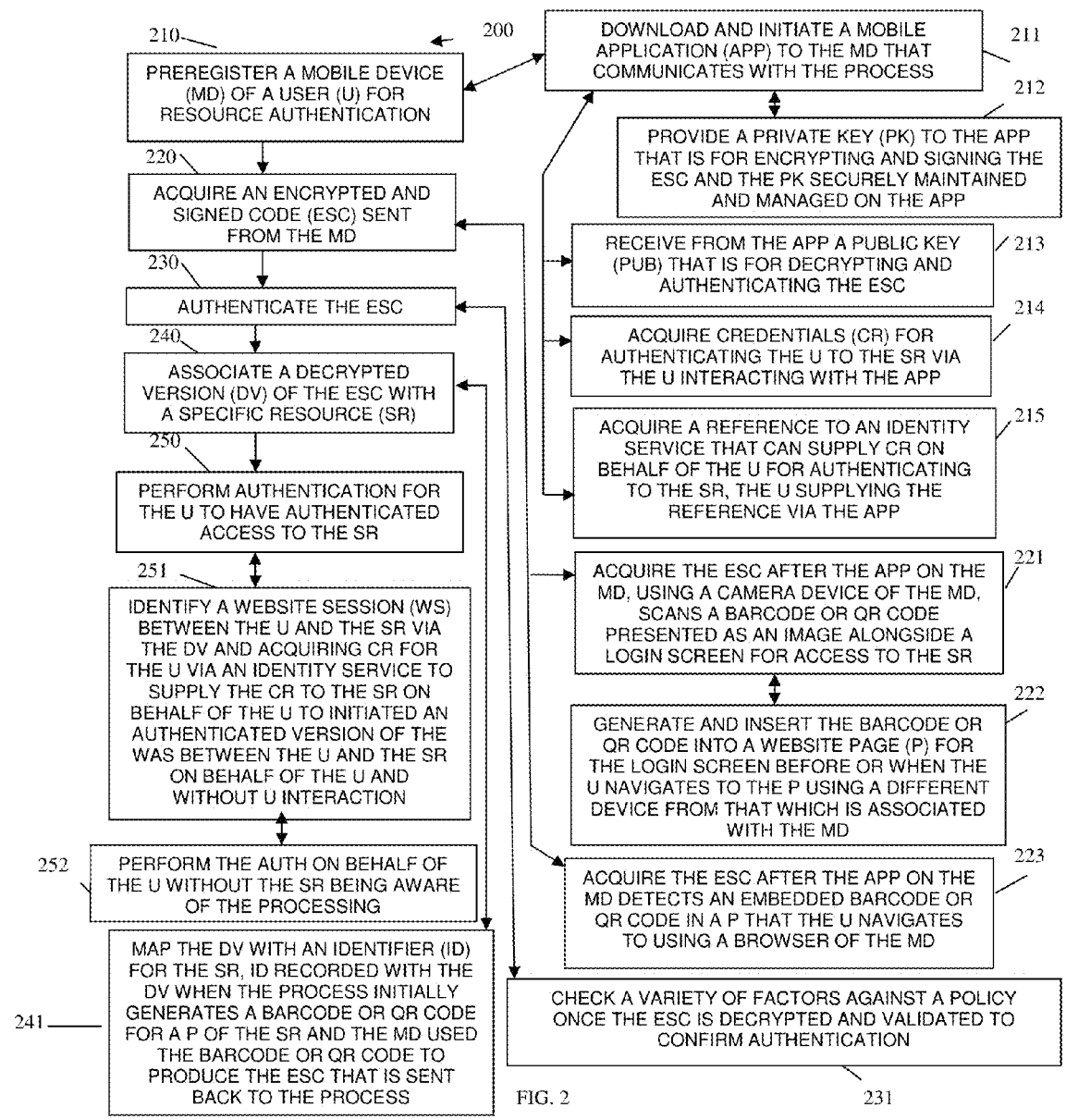
FIG. 2 is a diagram of method for authentication via a mobile device, according to an example embodiment.
Figure 3:
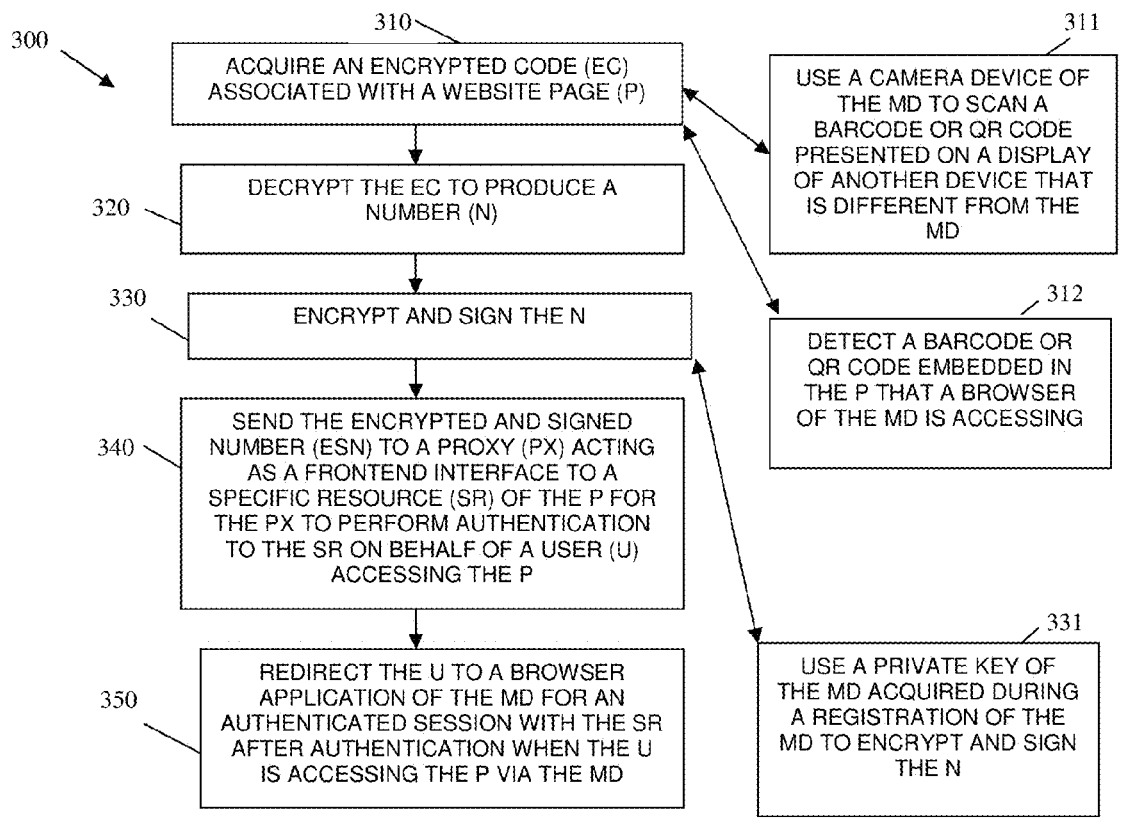
FIG. 3 is a diagram of another method for authentication via a mobile device, according to an example embodiment.
Figure 4:
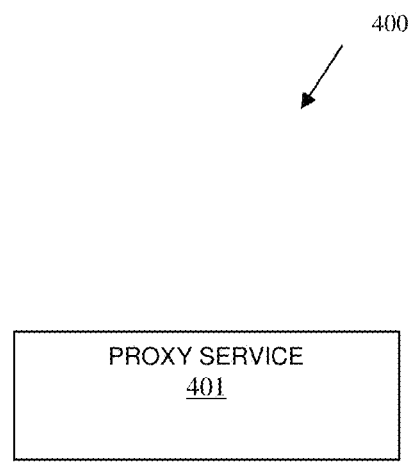
FIG. 4 is a diagram of a mobile device authentication system, according to the techniques presented herein.

The remaining FIGS. 2-4 now provide specific embodiments of the overall techniques discussed above with reference to the FIG. 1.

FIG. 2 is a diagram of method 200 for authentication via a mobile device, according to an example embodiment. The method 200 (hereinafter "proxy authentication manager") is implemented and resides within a non-transitory computer-readable or processor-readable medium that executes on one or more processors of a network. Moreover, the proxy authentication manager is operational over a network and the network may be wired, wireless, or a combination of wired and wireless.

At 210, the proxy authentication manager preregisters a mobile device of a user for resource authentication. This can occur in a variety of manners. For example, the user may register the mobile device by directly interfacing with an interface of the proxy authentication manager. In other situation, the user may register the mobile device with a loyalty program or a retailer and provide authorization for the retailer to register the mobile device of the user with the proxy authentication manager.

According to an embodiment, at 211, the proxy authentication manager downloads and initiates a mobile application to the mobile device. The mobile application once initiated on the mobile device is cable of establishing a network connection and securely communicating with the proxy authentication manager.

Continuing with the embodiment, at 212, the proxy authentication manager provides a private key to the mobile application, which is for encrypting and signing an encrypted and signed code (discussed below with reference to the processing at 220). The private key is then securely maintained and managed by the proxy authentication manager on the mobile device.

In another case of 211 and at 213, the proxy authentication manager receives from the mobile application a public key that is for decrypting and authenticating the encrypted and signed code. In this case, the mobile application generates the private-public key pair for the mobile device or the specific instance of the mobile application on the mobile device. The private key remains on the mobile device and is again securely maintained and managed by the mobile application. The public key is then sent back to the proxy authentication manager for use (as described below).

Still continuing with the embodiment of 211 and at 214, the proxy authentication manager acquires credentials for authenticating the user to the specific resource (discussed below with reference to the processing at 240). The credentials are provided at the direction of the user via interactions with the mobile application. This may entail providing credentials or providing a mechanism or resource from which the mobile application can acquire or communicate where to find the credentials.

In another case of 211 and at 215, the proxy authentication manager acquires a reference to an identity service that can supply the credentials on behalf of the user for authentication to the specific resource. It may be that the user identifies the identity service or the mobile application identifies a list of identity services and the user selects one. In some cases, the user may be required to separately log onto the selected identity service and provide the credentials for the specific resource.

At 220, the proxy authentication manager acquires an encrypted and signed code that is sent back from the mobile device. This is a situation that occurs some period of time after the processing associated with 210-215 and it is a situation where the user is trying to login to a site and acquire access to a secure resource.

According to an embodiment, at 221, the proxy authentication manager acquires the encrypted and signed code after the mobile application on the mobile device, using a camera embedded in the mobile device, scans a barcode or QR code that is presented as an image alongside a login screen for access to the specific resource. So, consider a website page that requires credentials for logging in to access one or more secure resources. The website page includes the barcode or QR code that the user scans via a camera to acquire the barcode and QR code with the mobile application.

In some situations, at 222, the proxy authentication manager actually generated and inserted the barcode or QR code into the website page for the login screen before or when the user navigates to the website page using a different device from that which is associated with the mobile device. In other words, the user may be on a computer, tablet, or laptop when the user navigates to the website page a new session is generated to render a version of the website page to the user on that device and the proxy authentication manager generates a new unique barcode or QR code that is embedded in the website page. The user accesses the camera and scans the code, via the mobile device (different from the device the user used to navigate to the website page) so that the mobile application now has the code.

In another case, at 223, the proxy authentication manager acquires the encrypted and signed code after the mobile application on the mobile device detects an embedded barcode or QR code in the website page that the user navigates to using a browser application of the mobile device. Here, the user navigates to the specific resource's login website page, via the mobile device, and the mobile application detects the embedded QR code or barcode for processing and sending to the proxy authentication manager.

At 230, the proxy authentication manager authenticates the encrypted and signed code. Here, the mobile application has decrypted the encoded barcode or QR code to acquire a unique number. That unique number is then encrypted and signed with the private key of the mobile device and/or the mobile application and provided to the proxy authentication manager for validation. The proxy authentication manager can validate the signature and decrypt via the public key of the mobile device and/or mobile application. The number may also provide a mechanism for the proxy authentication manager to identify the specific resource that the user is attempting to authenticate to via the mobile device.

According to an embodiment, at 231, the proxy authentication manager checks a variety of factors against a policy once the encrypted and signed code is decrypted and validated to confirm authentication. Some of these factors were discussed above with reference to the FIG. 1. So, added security can be implemented to ensure that a barcode or QR code is used within a predefined period of time or used within a specific geographic area, and the like.

At 240, the proxy authentication manager associates a decrypted version of the encrypted and signed code with a specific resource. In some cases, the encrypted and signed code sent from the mobile application of the mobile device can identify the specific resource or website page for logging into and authenticating to the specific resources.

In other cases, at 241, the proxy authentication manager can map the decrypted version with an identifier for the specific resource, where the identifier was previously recorded with the decrypted version when the proxy authentication manager initially generated a barcode or QR code for the website page of the specific resource and the mobile device, via the mobile application, used the barcode or QR code for the website page to produce the initially sent encrypted and signed code (sent back to proxy authentication manager). In other words, since the proxy authentication manager created and populated the barcode or QR code to the website page, when the decrypted version of the code is sent to it from the mobile device, the proxy authentication manager can re-map the code to the proper specific resource and website page.

At 250, the proxy authentication manager performs authentication for the user to have an authenticated session to the specific resource. That is, since the proxy authentication manager knows that the proper use authenticated via the mobile device with the encrypted and signed code and knows the website page for which the code originated and the specific service, the proxy authentication manager can acquire the credentials of the user and provide to the specific resource on behalf of the user to authenticate the website page for an authenticated session between the user and the specific resource.

According to an embodiment, at 251, the proxy authentication manager identifies the website session between the user and the specific resource via the decrypted version of the code. Next, the proxy authentication manager acquires credentials for the user via an identity service to supply the credentials on behalf of the user and to initiate an authenticated session of the website session between the user and the specific resource on behalf of the user and without user interaction. Here, the identity service performs the authentication with the specific resource on behalf of the user and the proxy authentication manager.

Continuing with the embodiment of 251 and at 252, the proxy authentication manager performs or causes to perform the authentication of the user with the specific resource without the specific resource being aware of the processing. That is, the proxy authentication manager acts as a transparent proxy to the specific resource and the specific resource can be any legacy resource that is accessible over the web that is integrated with the processing described herein to provide barcode and QR mobile device authentication of a user without being aware that this is occurring.

FIG. 3 is a diagram of another method 300 for authentication via a mobile device, according to an example embodiment. The method 300 (hereinafter "website authenticator") is implemented and resides within a non-transitory computer-readable or processor-readable medium that executes on one or more processors of a network. Moreover, the website authenticator is operational over a network and the network may be wired, wireless, or a combination of wired and wireless.

The website authenticator provides processing from the perspective of the mobile application that processes on a user's mobile device. The website authenticator interacts with the processing on the server or cloud represented by the method 200 of the FIG. 2. Moreover, the processing of the website authenticator assumes that the mobile application that represents the mobile application and its mobile device have preregistered with the processing of the method 200 of the FIG. 2.

At 310, the website authenticator (mobile application) acquires an encrypted code associated with a website page.

According to an embodiment, at 311, the website authenticator uses a camera device of the mobile device to scan a barcode or QR code presented on a display of another device that is different from the mobile device that the website authenticator processes on.

In another case, at 312, the website authenticator detects a barcode or QR code embedded in the website page that a browser of the mobile device is accessing via a browser application of the mobile device. The image is detected in the website page and scanned to see if it is a barcode or QR code to be used for user authentication to a resource via the mobile device.

At 320, the website authenticator decrypts the encrypted code to produce a number (previously generated for this website session by the method 200 of the FIG. 2 in the manners discussed above with reference to the FIG. 2).

At 330, the website authenticator encrypts and then signs the number.

In an embodiment, at 331, the website authenticator uses a private key of the mobile device, acquired during a previous registration of the mobile device or an instance of the website authenticator, to encrypt and sign the number.

At 340, the website authenticator sends the encrypted and signed number to a proxy acting as a frontend interface to a specific resource of the website page. The proxy processing was described above with reference to the FIG. 2. The proxy performs or causes to perform (via an identity service) authentication of the user to the specific resource on behalf of the user using credentials and an authentication mechanism expected by the specific resource. This can be achieved without modifying the processing of the specific resource and without the specific resource and its resources being aware of the third-party mobile device authentication that is taking place on behalf of the user.

In an embodiment, at 350, and where the user access the website page via the mobile device, the website authenticator redirects the user to a browser application of the mobile device for an authenticated session with the specific resource after authentication.

FIG. 4 is a diagram of a mobile device authentication system 400, according to the techniques presented herein. The components of the mobile device authentication system 400 are implemented within and reside within a non-transitory and computer or processor-readable storage medium for purposes of executing on one or more processors of a network. The network may be wired, wireless, or a combination of wired and wireless.

The mobile device authentication system 400 implements, inter alia, various aspects of the FIG. 1, and the methods 200 and 300 of the FIGS. 2 and 3, respectively.

The mobile device authentication system 400 includes a proxy service 401.

The mobile device authentication system 400 includes one or more processors configured with the proxy service 401, which is implemented in a non-transitory computer-readable storage medium as executable instructions that process on the processor(s).

In an embodiment, the processors are a server or cloud-based set of servers.

Example processing associated with the proxy service 401 was presented above with reference to the FIGS. 1-2.

The proxy service 401 is configured to act as a frontend interface to a resource that requires authenticated access, the proxy service 401 also configured to authenticate a user, via a mobile device of the user, using an encrypted and signed code processed by a mobile application (such as the website authenticator of the FIG. 3) of the mobile device from a barcode or QR code.

The barcode or QR code injected into a website for logging into the resource by the proxy service 401. The proxy service 401 uses the processed encrypted and signed code to acquire credentials for the user and to provide the credentials to the resource to establish an authenticated session between the user and the resource.

According to an embodiment, the proxy service 401 is a transparent proxy to the resource, and the user accesses the website via a different device from the mobile device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors or a proxy device and configured to perform the method, comprising:

preregistering, by the proxy device, a mobile device of a user for resource authentication;

acquiring, by the proxy device, an encrypted and signed code sent from the mobile device;

authenticating, by the proxy device, the encrypted and signed code;

associating, by the proxy device, a decrypted version of the encrypted and signed code with a specific resource; and performing authentication, at the direction of the proxy device, for the user to have authenticated access to the specific resource by authenticating the user to a pre-existing login process of the specific resource with user credentials known to the specific resource, and wherein the proxy device processing as a transparent proxy to the user and processing as a reverse proxy to the specific resource and wherein the specific resource is unaware of the reverse proxy and the encrypted and signed code sent to the proxy device by the mobile device;

wherein performing further includes identifying a website session between the user and the specific resource via the decrypted version and acquiring credentials for the user via an identity service to supply the credentials to the specific resource on behalf of the user to initiate an authenticated version of the website session between the user and the specific resource on behalf of the user and without user interaction.

2. The method of claim 1, wherein preregistering further includes downloading and initiating a mobile application to the mobile device that communicates with the method.

3. The method of claim 2, wherein initiating further includes providing a private key to the mobile application that is for encrypting and signing the encrypted and signed code and the private key securely maintained and managed on the mobile application.

4. The method of claim 2, wherein initiating further includes receiving from the mobile application a public key that is for decrypting and authenticating the encrypted and signed code.

5. The method of claim 2, wherein preregistering further includes acquiring credentials for authenticating the user to the specific resource via a user interacting with the mobile application.

6. The method of claim 2, wherein preregistering further includes acquiring a reference to an identity service that can supply credentials on behalf of the user for authenticating to the specific resource, the user supplying the reference via the mobile application.

7. The method of claim 1, wherein acquiring further includes acquiring the encrypted and signed code after a mobile application on the mobile device, using a camera device of the mobile device, scans a barcode or Quick Response (QR) code presented as an image alongside a login screen for access to the specific resource.

8. The method of claim 6, wherein acquiring further includes generating and inserting the barcode or QR code into a website page for the login screen before or when the user navigates to the website page using a different device from that which is associated with the mobile device.

9. The method of claim 1, wherein acquiring further includes acquiring the encrypted and signed code after a mobile application on the mobile device detects an embedded barcode or Quick Response (QR) code in a website page that the user navigates to using a browser of the mobile device.

10. The method of claim 1, wherein authenticating further includes checking a variety of factors against a policy once the encrypted and signed code is decrypted and validated to confirm authentication.

11. The method of claim 1 wherein associating further includes mapping the decrypted version with an identifier for the specific resource, the identifier recorded with the decrypted version when the method initially generated a barcode or Quick Response (QR) code for a website page of the specific resource and the mobile device used the barcode or quick response code to produce the encrypted and signed code that is sent back to the method.

12. The method of claim 1, wherein identifying further includes performing the authentication on behalf of the user without the specific resource being aware of the method.

* * * * *

UNITED STATES PATENT AND TRADEMARK OFFICE
CERTIFICATE OF CORRECTION

PATENT NO. : 8,943,320 B2  
APPLICATION NO. : 13/285487  
DATED : January 27, 2015  
INVENTOR(S) : Sabin et al.

Page 1 of 1

It is certified that error appears in the above-identified patent and that said Letters Patent is hereby corrected as shown below:

In the Claims

In column 10, line 55-60, in Claim 7, delete "7. The method of claim 1, wherein acquiring further includes acquiring the encrypted and signed code after a mobile application on the mobile device, using a camera device of the mobile device, scans a barcode or Quick Response (QR) code presented as an image alongside a login screen for access to the specific resource." and insert --7. The method of claim 6, wherein acquiring further includes generating and inserting the barcode or QR code into a website page for the login screen before or when the user navigates to the website page using a different device from that which is associated with the mobile device.--, therefor In column 10, line 61-65, in Claim 8, delete "8. The method of claim 6, wherein acquiring further includes generating and inserting the barcode or QR code into a website page for the login screen before or when the user navigates to the website page using a different device from that which is associated with the mobile device." and insert --8. The method of claim 1, wherein acquiring further includes acquiring the encrypted and signed code after a mobile application on the mobile device, using a camera device of the mobile device, scans a barcode or Quick Response (QR) code presented as an image alongside a login screen for access to the specific resource.--, therefor Signed and Sealed this  
Twelfth Day of May, 2015

Michelle K. Lee  
*Director of the United States Patent and Trademark Office*